United States Patent
Royan et al.

(10) Patent No.: US 8,131,514 B2
(45) Date of Patent: Mar. 6, 2012

(54) METHODS, DEVICES AND PROGRAMS FOR TRANSMITTING ROOF AND BUILDING STRUCTURE OF A 3D REPRESENTATION OF A BUILDING ROOF BASED ON SAID STRUCTURE

(75) Inventors: Jérôme Royan, Chasne-Sur-Illet (FR); Patrick Gioia, Servon Sur Vilaine (FR); Romain Cavagna, Chasne-Sur-Illet (FR)

(73) Assignee: France Telecom, Paris (FR)

( * ) Notice: Subject to any disclaimer, the term of this patent is extended or adjusted under 35 U.S.C. 154(b) by 861 days.

(21) Appl. No.: 12/089,892

(22) PCT Filed: Oct. 11, 2006

(86) PCT No.: PCT/FR2006/002284
§ 371 (c)(1),
(2), (4) Date: Aug. 1, 2008

(87) PCT Pub. No.: WO2007/042667
PCT Pub. Date: Apr. 19, 2007

(65) Prior Publication Data
US 2009/0132210 A1    May 21, 2009

(30) Foreign Application Priority Data
Oct. 11, 2005    (FR) ...................................... 05 10384

(51) Int. Cl.
*G06F 17/50*    (2006.01)

(52) U.S. Cl. .......................................................... 703/1
(58) Field of Classification Search .................. 703/6, 1
See application file for complete search history.

(56) References Cited

U.S. PATENT DOCUMENTS
2005/0012742 A1    1/2005    Royan

FOREIGN PATENT DOCUMENTS
EP    1455308 A1    9/2004

OTHER PUBLICATIONS
J. Royan, C. Bouville, and P. Gioia, PBTree—A New Progressive and Hierarchical Representation for Network-Based Navigation in Urban Environments, Proc. Vision, Modeling, and Visualization, 2003, pp. 299-307.*

(Continued)

*Primary Examiner* — Hugh Jones
(74) *Attorney, Agent, or Firm* — David D. Brush; Westman, Champlin & Kelly, P.A.

(57) ABSTRACT

A technique is provided for transmitting a roof structure for constructing a three-dimensional representation of a building, via a communication network. The technique is based on the transmission of an ordered list of at least two roof models, each including at least: one type of roof; one maximum height parameter of the roof. During construction of the three-dimensional representation of a building, the maximum height parameter of a roof of the list determines a base of the roof in accordance with the list, so that the roof structure corresponds to the ordered superimposition of the roods of the list.

8 Claims, 5 Drawing Sheets

OTHER PUBLICATIONS

International Search Report from counterpart foreign Application No. PCT/FR2006/002284.

French Search Report from counterpart foreign Application No. FR 05/10384.

International Preliminary Report on Patentability from counterpart foreign Application No. PCT/FR2006/002284.

G. Zhou et al. "Web-Based Urban 3D GIS: Virtual Environment of 3D Model Visualization" Oct. 28, 2004, pp. 1-7, XP002391935.

Jaynes C.O. et al., "Building Reconstruction from Optical and Range Images" Computer Vision and Pattern Recognition, 1997. Proceedings., 1197 IEEE Computer Society Conference on San Juan, Puerto Rico Jun. 17-19, 1997, Los Alamitos, CA, USA, IEEE, Comput. Soc, US, Jun. 17, 1997, pp. 380-386 XP010237552.

Coors V., "Graphical Abstraction and Progressive Transmission on Internet-Based 3D-Geoinformationsystems" Dissertation Tu Darmstadt, Jan. 29, 2003, pp. 132-148. XP002391936.

Haithcoat T. L. et al., "Building Footprint Extraction and 3-D Reconstruction from LIDAR data" Remote Sensing and Data Fusion Over Urban Areas, IEEE/ISPRS Joint Workshop 2001 Nov. 8-9, 2001, Piscataway, NJ, USA, IEEE, Nov. 8, 2001, pp. 74-78. XP010578718.

\* cited by examiner

METHODS, DEVICES AND PROGRAMS FOR TRANSMITTING ROOF AND BUILDING STRUCTURE OF A 3D REPRESENTATION OF A BUILDING ROOF BASED ON SAID STRUCTURE

CROSS-REFERENCE TO RELATED APPLICATIONS

This Application is a Section 371 National Stage Application of International Application No. PCT/FR2006/002284, filed Oct. 11, 2006 and published as WO 2007/042667A1 on Apr. 19, 2007, not in English.

FIELD OF THE DISCLOSURE

The field of the disclosure is that of the visualization of three-dimensional images and 3D scenes. More specifically, the disclosure relates to a technique of data transmission enabling the visualization of such images or such scenes on a client terminal as well as the processing of this data at reception.

It can be applied more particularly to the visualization of models of cities or urban scenes constituted by a set of buildings, and proposes a technique for the automatic reconstruction of roofs on the basis of the "eave gutter" contours of the buildings. It therefore enables the display, on a remote browser, of 3D models of buildings that is faithful to reality, with roofs of varying complexity.

BACKGROUND OF THE DISCLOSURE

1. Prior Art Solutions

There are several techniques known to date for the automatic modeling of vast urban environments which all aim at the same goal of reducing the cost of modeling towns and cities. These techniques rely for example on methods of photogrammetry, radar image analysis, and the use of elevation maps obtained from airborne scanners.

Most of these techniques provide what are called "2D½" models consisting of a set of footprints of buildings which are associated with the altitude at the base of the buildings and their eaves-gutter height. This modeling is therefore prismatic since, in order to obtain a 3D depiction of a building, it consists of the extrusion of the building footprint along its eaves-gutter height. Once the walls have been rebuilt by means of this extrusion technique, then in order to obtain a realistic rendering of the city or of the building, it is also necessary rebuild a 3D representation of the roof.

To date, there are several known techniques of transmission of a roof model enabling a remote browser to carry out a rebuilding such as this.

Thus, a first technique relying on the VRML (Virtual Reality Modeling Language) consists of the transmission of the roof model in the form of a set of polygons corresponding to different faces, also called sloping sides, of the roof to be rebuilt (known as the "indexed face set" function in VRML).

Another technique proposed by P. Felkel and S. Obdrzalek in "Straight skeleton implementation" (Spring Conference on Computer Graphics, 1998), consists of the automatic reconstruction of a roof from the footprint of the building, in determining its straight skeleton, and in carrying out an elevation of its peaks.

2. Drawbacks of the Prior Art

These different techniques however cannot be used to comply with the following constraints jointly:

low bit rate of most of the current communications networks, and need for realism of viewing by the final users.

Thus, the technique which consists of the transmission of a roof model, in VRML, in the form of a set of its faces generates a very large volume or even a prohibitively large volume of data in the case of complex roofs. While, at reception, it enables the rebuilding of most shapes of roofs in a fairly realistic way, it is quite unsuited in the case of a town model which may contain several hundreds of thousands of buildings and for which the transmission time, through the network, of the set of 3D roof models will be considerable.

The technique of automatic roof building proposed by P. Felkel and S. Obdrzalek for its part is less costly in terms of resources since, for providing the roof structure, it is based on the straight skeleton of the footprint of the building which furthermore has already been transmitted to the user. However, this technique does not enable the rebuilding of 3D depictions of hip type roofs, also called roofs with several sloping sides, wherein the sloping sides have the same slope angle relative to the horizontal. This technique is therefore not suited to the depiction of models of real towns in which the buildings may have roofs of all types and especially complex gable roofs and hip roofs having a multiplicity of sloping sides.

SUMMARY

An aspect of the disclosure relates to a method for the transmission of a roof structure for the reconstruction of a 3D representation of a building through a communications network.

According to an embodiment of the invention, such a method comprises a step for the transmission of an ordered list of at least two roof models each comprising at least:

a type of roof;

a maximum height parameter of said roof;

and said maximum height parameter of a roof of said list determines a base of the following roof in said list so that said roof structure corresponds to the ordered superimposition of said roofs of said list.

Thus, an embodiment of the invention relies on a wholly novel and inventive approach to a transmission of roof structures for the rebuilding or reconstruction of 3D depictions of buildings.

Indeed, an embodiment of the invention proposes a technique relying on the use of procedural roof models constituting a simple and compact data transmission shape: indeed, each roof model is described by means of a type of roof (which may be encoded on only some bits, depending on the number of roof types envisaged), and one or more parameters, including a maximum height parameter. The volume of data needed for the transmission of each roof model is then relatively small.

Furthermore, these roof models are transmitted in an ordered list, the ordering of which defines their order of superimposition in the roof structure to be rebuilt. It is thus possible, by superimposition of different roofs of the list, to rebuild 3D representations of complex roofs, enabling a highly realistic rendering for the final user.

The technique of an embodiment of the invention therefore enables a resolving of the twofold technical problem of the compactness of data to be transmitted and the realism and complexity of the rebuilt roofs.

Advantageously, said type of roof is chosen from a group comprising:
- a gable type roof;
- a hip type roof;
- a saltbox type roof.

A few definitions are recalled here below: a gable roof is understood to be a roof having at least one gable and the term "gable" designates the triangular crown of a wall whose peak bears the end of the roof-ridge. By opposition, hip roofs designate roofs that have no gables at their ends but a slope (here below called a sloping side) which provides the link with the two large sides of the roof. A hip roof is therefore a roof comprising at least four inclined slopes forming at least four edges at their intersections in sets of two. (It will be noted of course that if the footprint of the building is triangular, it may happen that the hip roof of this building has only three inclined slopes.) Here below, a hip roof is also designated as a roof with several sloping faces as opposed to a saltbox or roof with only one sloping face which has only one inclined side.

Preferably, said roof models of said ordered list also comprise at least one of the parameters belonging to the group comprising:
- a slope angle parameter of at least one sloping side of said roof;
- a projection parameter of at least one eave of said roof.

The maximum height of the roof, the slope angle of its different slopes as well as, in the event of a presence of an eave, its projection enables the rebuilding of a full 3D representation of the roof once its type has been identified. The projection parameter of the eave indeed enables a recomputation of the position of the peaks bordering the roof so as to make them extend out of the walls of the building while following the inclination of the roof sloping walls. The projection of the eave designates the minimum distance between the end of the roof projecting beyond the wall of the building and this wall itself.

According to an advantageous characteristic, when said roof is of a saltbox type, said roof model also comprises a supporting edge parameter defined by an index of the lowest edge of said building belonging to said roof.

When said edge has furthermore already been transmitted for the rebuilding of the walls of the building, it is then enough to recall its index in association with the corresponding roof model during the transmission of the roof structure.

Advantageously, said ordered list also comprises at least one flat type roof model that includes no parameter. In adding the flat roofs to the hip, gable and saltbox roofs, a minimum list of types of roofs is obtained enabling the rebuilding of the totality of the existing roofs, whether they are simple or complex. By definition, the flat roof has zero height and inclination and is therefore not associated with any parameter. It is possible however, with a view to homogeneity in the transmission of the roof models, to envisage the association of zero parameters with it.

An embodiment of the invention also relates to a data signal representing a roof structure for the building of a 3D representation of a building that presents the structure of an ordered list of at least two roof models each comprising at least:
- a field containing a type of roof;
- a field containing a maximum height of said roof.

The field containing a maximum height of a roof of said list determines a base of the following roof in said list so that said roof structure corresponds to the ordered superimposition of said roofs of said list.

The ordered list structure of the signal enables the definition of the order in which the roof models transmitted must be superimposed to rebuild the real roof structure of the building, and thus obtain a 3D representation of a complex roof from simple elementary bricks. These simple elementary bricks are procedural roof models structured as data fields comprising a type of roof and a maximum roof height: from this simple structure follows a small volume of data to be transmitted.

In other words, one roof structure per building, giving a good approximation of the real roof with very few pieces of data, is transmitted to the network.

Preferably, said field containing a type of roof may take three distinct values depending on whether the type of roof is:
- a gable type of roof;
- a hip type of roof;
- a saltbox type of roof.

For example, a hip roof is encoded as "1", a gable roof is encoded as "2" and a saltbox roof is encoded as "3". For greater precision, the field containing the type of roof may take five distinct values depending on whether the roof is of a flat type, a gable type, a hip type, a saltbox type or else a type having several sides with distinct slopes.

Advantageously, the structure of the signal of an embodiment of the invention is such that said models of roofs of said ordered list also comprise at least one of the fields belonging to the group comprising:
- a field containing a slope angle parameter for at least one sloping side of said roof;
- a field containing a projection parameter for at least one eave of said roof.

Preferably, when said field containing a type of roof indicates that said roof is of a saltbox type, the roof model also comprises a field containing a supporting edge parameter, defined by an index of the lowest edge of said building belonging to said roof.

An embodiment of the invention also relates to a data carrier designed to store the above-mentioned data signal having a structure for the storage of an ordered list of at least two roof models stored in the form of at least:
- a storage zone containing a type of roof;
- a storage zone containing a maximum height of said roof.

The structure of a data carrier of this kind is such that the storage zone containing a maximum height of a roof of said list determines a base of the following roof in said list, so that said roof structure corresponds to the ordered superimposition of said roofs of said list.

An embodiment of the invention also relates to a computer program product downloadable from a communications network and/or stored on a computer-readable carrier and/or executable by a microprocessor comprising program code instructions for the implementation of the method of transmission of a roof structure as described here above.

An embodiment of the invention also relates to a transmission server of a roof structure for the building of a 3D representation of a building through a communications network, comprising means for the transmission of an ordered list of at least two roof models each comprising at least:
- a type of roof;
- a parameter of maximum height of said roof.

Said maximum height parameter of a roof of said list determines a base of the following roof in said list so that said roof structure corresponds to the ordered superimposition of said roofs of said list.

An embodiment of the invention also concerns a method for building a 3D representation of a roof of a building.

According to an embodiment of the invention, such a method comprises a step for obtaining a roof structure in the form of an ordered list of at least two roof models each comprising at least:
  a type of roof;
  a maximum height parameter of said roof;
and it implements:
  at least one iteration of the following steps, for each of said roofs of said ordered list except for the last one:
    building a representation of a roof of said list, as a function of said type of roof, from at least one upper face of said building;
    truncation of said built roof as a function of said parameter of maximum height of said roof, delivering a truncated roof;
    determining at least one upper face of said truncated roof that becomes said at least one upper face of said building;
  for the last roof of said ordered list, a step of building a representation of said roof, as a function of said type of roof, from said at least one upper face of said building and, if the height of said last roof built is greater than the maximum height of said last roof, a step of truncation of said last roof built.

The obtaining of the ordered list may consist, for example, of a reception of this list transmitted by means of a communications network (such as the worldwide Internet network for example) or a loading of this list from a data carrier (of the CD-ROM or DVD type). This successive superimposition of the roofs of the list, by their truncation as a function of their maximum height, enables the rebuilding of complex roofs. Thus, by superimposing two gable roofs having distinct slope angles of the set of their sloping sides, it is possible to obtain a 3D representation of a curb roof. It may be recalled that a curb roof is a roof with two slopes, each of which is broken by an obtuse angle so that the lower slope is steeper than the upper slope.

It is possible to superimpose a very large number of roofs as a function of the number of models conveyed by the list. The superimposed roofs may be of a gable type, hip type and saltbox type, and, for the last roof of the list, a flat type.

According to an advantageous characteristic, said step of building a representation of a roof comprises sub-steps of:
  computation of a 2D structure of said roof;
  elevation of said roof as a function of at least one slope angle of said roof.

Thus, after the peaks of the roof in its 2D structure have been identified, they are shifted in the vertical sense, according to their height, for the building of a 3D representation of the roof. The height of the peaks is computed as a function of the slope of the different sloping sides of the roof.

If the roof includes an eave, said step of building a representation of a roof of said list comprises a sub-step of computation of a projection of at least one eave of said roof, enabling the external peaks of the roof to be shifted so as to project out of the walls of the building.

According to an advantageous characteristic of an embodiment of the invention, said step of truncation of said built roof comprises sub-steps of:
  determining a truncation plane whose altitude relative to said upper face of said building is equal to said maximum height of said roof;
  scanning the edges of said built roof and marking the position of said edges relative to said truncation plane;
  building of a list of edges and/or portions of edges situated beneath said truncation plane, called a list of higher edges of said roof;
  scanning said list of higher edges of said roof in order to determine said at least one upper face of said truncated roof.

Thus, when a roof of the list goes beyond the limit height, fixed for example by a user, it is truncated. This cutting of the roof gives one or more polygons corresponding to the upper part of the truncated roof. So long as there are roofs to be superimposed in the ordered list, the process is reiterated in taking, as the bases of the roof to be rebuilt, the upper faces resulting from the truncation of the previous roof.

Preferably, for a hip type roof or gable type roof, said sub-step for computing a 2D structure of said roof implements a computation of a straight skeleton of a polygon demarcating:
  a footprint of said building for the first roof of said ordered list;
  said at least one upper face of said building for the other roofs of said ordered list;
and, for a gable type roof, said sub-step of computation of a 2D structure of said roof also implements a projection of at least one end peak of said straight skeleton on at least one corresponding edge of said polygon.

Preferably, for a single-slope type roof or a flat type roof, said sub-step for computing a 2D structure of said roof implements a triangulation:
  of a footprint of said building for the first roof of said ordered list;
  of said at least one upper face of said building for the other roofs of said ordered list.

An embodiment of the invention also relates to a terminal for building a 3D representation of a building roof, comprising means to obtain a roof structure in the form of an ordered list of at least two roof models each comprising at least:
  a type of roof;
  a maximum height parameter of said roof;
and it implements:
  at least once, in the form of an iteration, for each of said roofs of said ordered list except for the last one:
    means of building a representation of a roof of said list, as a function of said type of roof, from at least one upper face of said building;
    means of truncation of said built roof, as a function of said parameter of maximum height of said roof, delivering a truncated roof;
    means of determining at least one upper face of said truncated roof that becomes said at least one upper face of said building;
  for the last roof of said ordered list, means of building a representation of said roof, as a function of said type of roof, from said at least one upper face of said building and, if the height of said last roof built is greater than the maximum height of said last roof, means of truncation of said last roof built.

An embodiment of the invention finally relates to a computer program product downloadable from a communications network and/or recorded in a computer-readable carrier and/or executable by a microprocessor, said computer program product comprising program code instructions for the implementation of the method for building a 3D representation of a building roof as described here above.

BRIEF DESCRIPTION OF THE DRAWINGS

Other features and advantages shall appear more clearly from the following description of a preferred embodiment, given by way of a simple non-exhaustive and illustrative example, and from the appended drawings, of which.

DETAILED DESCRIPTION OF ILLUSTRATIVE EMBODIMENTS

The general principle of an embodiment of the invention relies on the transmission of a roof structure in the form of an ordered list of procedural roof models. Each roof model has a simple structure comprising types of roofs and one or more building parameters, inducing a small volume of data to be transmitted. Furthermore, these different roofs can be superimposed in the order defined by the list to rebuild a 3D representation of the real roof structure.

Figure 1:
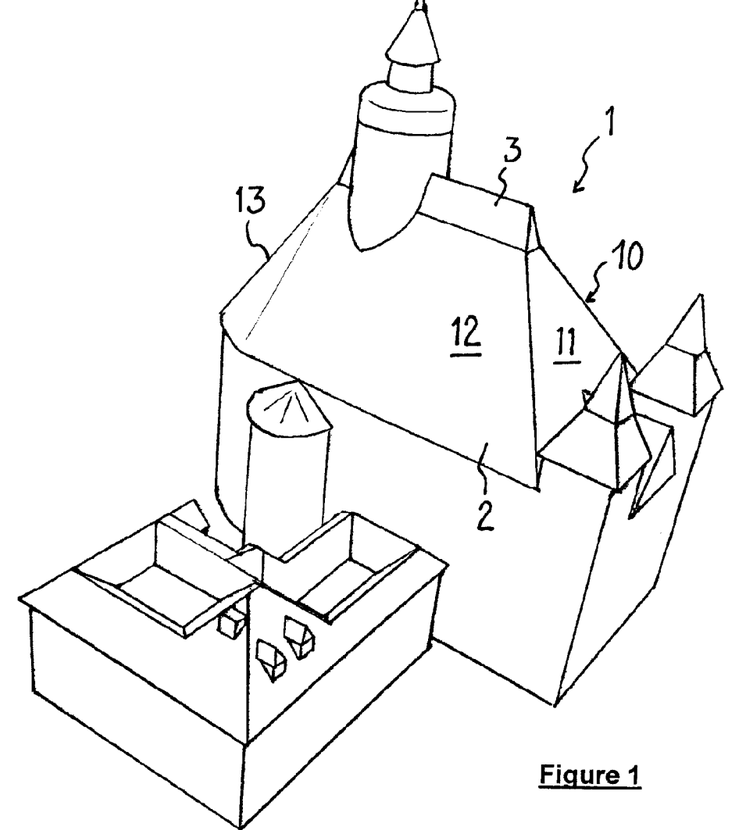
FIG. 1 shows an example of complex roofs for which it is possible to obtain a realistic 3D representation through the technique of an embodiment of the invention.

Referring to FIG. 1, an example is presented of complex roofs for which a 3D representation can be obtained according to a technique of an embodiment of the invention. FIG. 1 illustrates a church and the attached buildings. The roof 1 covering the nave of the church corresponds to the superimposition of two hip roofs: the lower hip roof 2 has three main slopes 10 to 12, a large number of smaller-sized sloping sides 13 above the choir of the church, to form the rounded portion of the roof; the sloping sides of the upper hip roof 3 has steeper slopes than the lower hip roof 2.

Figure 2:
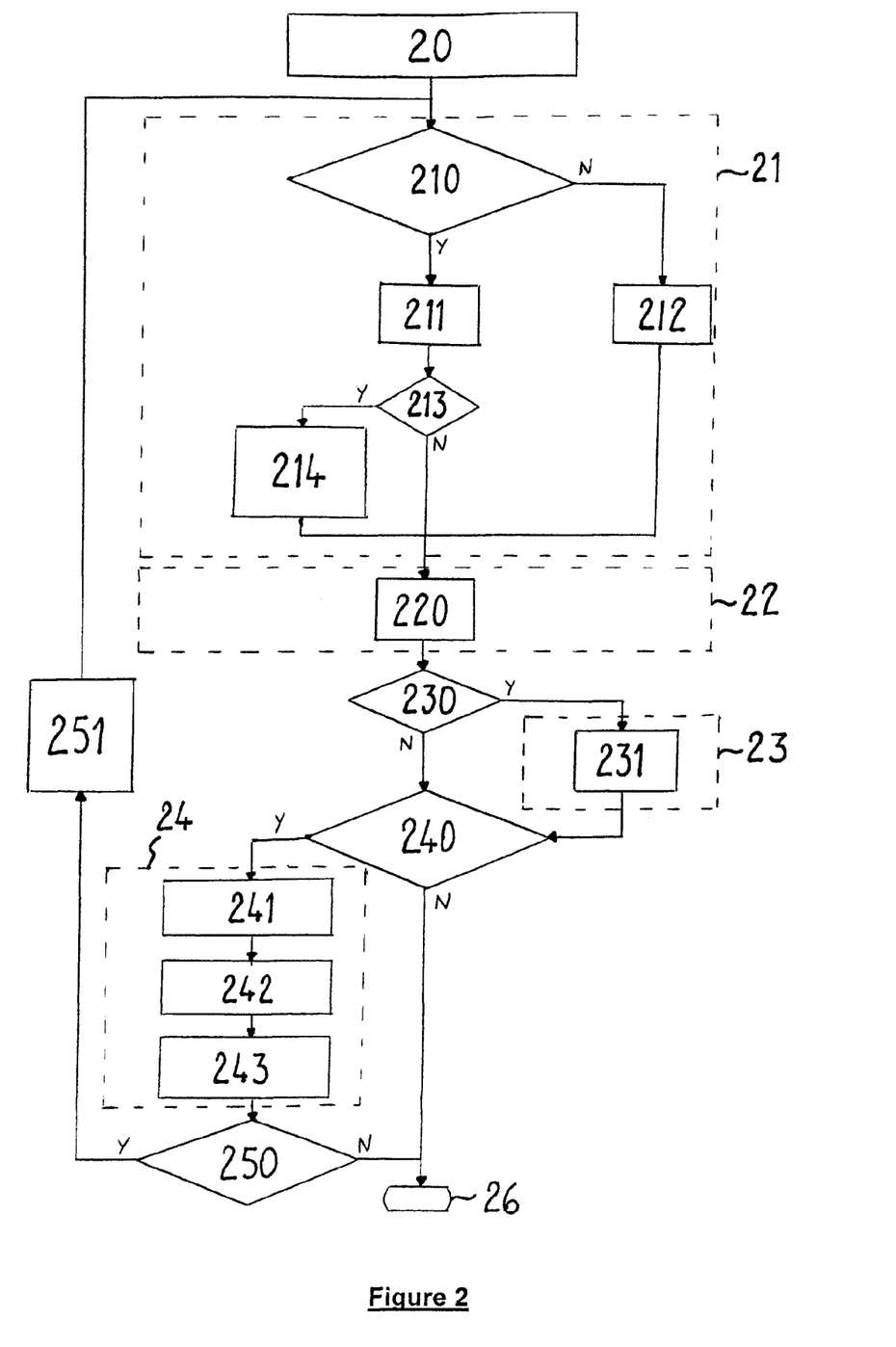
FIG. 2 is a detailed flow chart of the method for building a roof structure of an embodiment of the invention.

FIG. 2 is a detailed flow chart of the different steps of building a 3D representation of a building roof from an ordered list of procedural roof models.

The first step 20 is a step for obtaining the roof structure to be rebuilt in the form of an ordered list of models of simple roofs to be superimposed, defined by means of one or more procedural parameters. This step can result from the reception of the list, transmitted by a remote server via a communications network. It can also result from the loading of this list from a data carrier accessible to the building terminal that implements it. This terminal furthermore also has the footprint of the building whose roof it must rebuild. The way in which this footprint has been obtained is not the object of the present invention and shall therefore not be described here in greater detail. For greater information, reference could be made for example to the European patent No. EP 1 455 308 entitled "Procédé pour la gestion de la représentation d'au moins une scène 3D modélisée" (Method for managing the displaying of at least 3D scene) filed on behalf of the same Applicant as that of the present patent application.

The roofs of the ordered list may be one of the following types:
- flat roof (0=FLAT);
- hip roof (1=HIP);
- gable roof (2=GABLE);
- saltbox roof (3=SALT_BOX);
- a roof with several distinct sloping sides (4).

In the roof model field containing the type of roof, one of the values 0 to 4 is therefore encoded on three bits to indicate the type of roof considered.

The description of the data stream model uses an object-oriented syntax as described in Appendix A, which forms an integral part of the present description.

Each type of roof therefore has several procedural parameters associated with it. These parameters are necessary for the building of the 3D representation of the roof:

flat roof: no parameter, hip roof: with identical or distinct sloping sides
- the slope of the roof (or of each of the sides of the roof) expressed in degrees;
- the height of the roof enabling its upper part to be truncated;
- the projection of the eave, enabling each roof sloping side to be continued to the exterior of the footprint of the building;

gable roof:
- the slope of the roof expressed in degrees;
- the height of the roof enabling its upper part to be truncated;
- the projection of the eave, enabling each roof sloping side to be continued to the exterior of the footprint of the building;

saltbox roof:
- the slope of the roof sloping side expressed in degrees;
- the height of the roof enabling its upper part to be truncated;
- the projection of the eave, enabling each roof sloping side to be continued to the exterior of the footprint of the building;
- the index of the edge of the building on which the roof rests (lowest part of the roof).

This data stream model can be directly integrated into that of the footprint-based multi-resolution representation enabling the representation of a town model consisting of prismatic building models, which is the object of the above-mentioned European patent application: "Procédé pour la gestion de la representation d'au moins une scène 3D modélisé" (Method for managing the displaying of at least one 3D scene) (EP 1455308).

After obtaining it (20), the rebuilding terminal decodes this ordered list and extracts the successive roof models that it contains. For each of these models, it carries out two big successive phases of:
- computation 21 of the 2D structure of the roof;
- elevation 22 of the roof.

If an eave is defined, the terminal also performs a phase 23 of projection of the eave and, if the height of the roof exceeds the maximum height indicated in the roof model (for example the maximum height defined by a user), it performs a phase 24 of truncation of the roof. It thus acts iteratively for each of the roofs of the ordered list. These different phases are described here below in greater detail.

Thus, first of all, the first roof model of the ordered list is selected and the computation 21 of the 2D structure of the corresponding roof is performed.

To this end, a test 210 is made to find out if the roof is based on a straight skeleton, i.e. whether it is a hip type roof or a gable type roof.

If the answer is negative 212, i.e. if the roof is of flat type or saltbox type, its 2D structure is rebuilt by triangulation of the polygon constituted by the footprint of the building, according to a known technique which is not the object of the present invention and shall therefore not be described in greater detail. This triangulation is a triangulation constrained by the edges of the polygon.

If the answer is affirmative, a computation 211 is made of the straight skeleton of the footprint of the building, enabling the 2D structure of the roof to be obtained. This computation is done by means of the library implemented by P. Felkel and S. Obdrzalek as described in "Straight skeleton implementation", Spring Conference on Computer Graphics, 1998. This step of computation 211 of the straight skeleton shall be described in greater detail here below with reference to FIG. 3.

Figure 4:
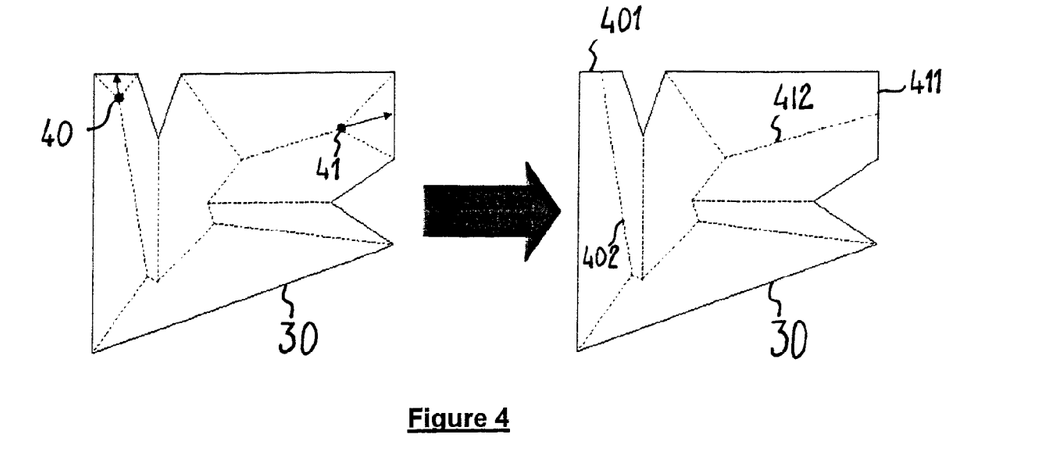
FIG. 4 describes the principle of projection of the end peaks on the corresponding edge of the footprint of a building in the case of a gable roof.

A test 213 is then conducted to find out whether the roof for which the straight skeleton has just been built is a gable type roof. If the answer is affirmative, a projection 214 is made of the end peaks 40, 41 of the straight skeleton (shown in dashes in FIG. 4) on the corresponding edges of the polygon 30 (representing the footprint of the building), as illustrated in FIG. 4. An end peak 40, 41 is defined as the intersection of two bisectors coming from consecutive angles of the footprint 30. The projection of this peak 40, 41 on the edge 401, 411 included between these two angles follows the direction of the cut edge 402, 412 attached to this end peak 40, 41.

At the end of this projection 214, or in the event of a negative response to the test 213, the method passes to the phase 22 of elevation of the roof.

The roof elevation phase 22 includes a single step 220 for computation of the height of the peaks of the 2D structure of the roof determined during the phase 21. This computation of the height of the peaks is done along the slope of the roof sloping sides, and gives a model of the roof that is no longer a 2D model but a 3D model. In other words, the slope angle parameter of each of the slopes of the roof (except of course in the case of the flat roofs) is read in the roof model transmitted in the ordered list. Then, each of the roof sloping sides is elevated so that the angle formed relative to the horizontal is equal to the slope of the roof stipulated in the procedural model of the roof considered, and by simple trigonometric computation, the height of each of the peaks relative to the base of the roof is determined.

After elevation 22 of the roof, which enables a 3D structure to be obtained, a test is carried out 230 to find out if an eave has been defined (by a user for example) for the roof model considered.

Figure 5:
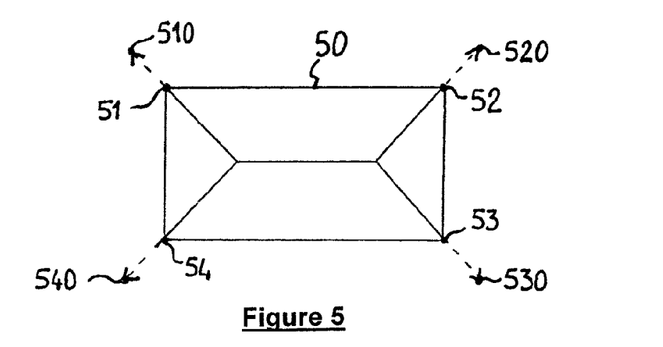
FIG. 5 illustrates the principle of shift of the external peaks of the 2D structure of a roof to create an eave.

If the answer is affirmative, the projection of the eave is computed 23. To this end, and as illustrated in FIG. 5, the external peaks 51 to 54 of the skeleton 50 (straight skeleton or 2D structure obtained by triangulation) corresponding to the original footprint are shifted 231 outwards (in the direction of the arrows shown in dashes), so as to be projecting relative to the walls of the building, while at the same time keeping the slope of the roof sloping sides. Thus, an eave is created. The computation of the position of these new peaks 510, 520, 530 and 540 takes account of the projection of the eave defined in the data stream described here above.

After computation 23 of the projection of the eave or if no eave is defined for the roof model considered, a test is made to find out whether or not the height of the roof for which a 3D structure has thus been built is greater than the maximum permitted height (for example defined by a user and indicated in the field corresponding to the roof model).

If the answer is negative, the roof rebuilding method comes to an end 26.

Figure 6:
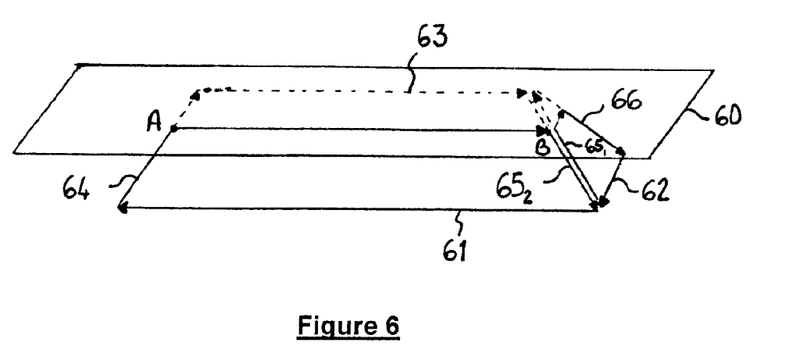
FIG. 6 illustrates the principle of truncation of a roof by a horizontal section plane.

If the answer is affirmative, the rebuilding terminal undertakes a phase 24 of truncation of the rebuilt roof, as illustrated in FIG. 6.

To this end, the set of edges constituting the 3D structure of the roof is considered. Each of these edges has a scanning direction associated with it and the edges that do not belong to the external envelope of the footprint are duplicated with two opposite scanning directions being associated with them.

At the step referenced 241, all the edges of the skeleton are scanned in order to carry out a marking corresponding to their position relative to the section plane 60, also called a truncation plane (horizontal plane whose height corresponds to the maximum height of the roof, as indicated in the corresponding field of the roof model considered):

Beneath: the edge is situated entirely beneath the section plane (edges 61, 62);

Above: the edge is situated entirely above the section plane (roof ridge 63);

Rising: the edge intersects the section plane in rising (taking account of the scanning direction considered, the point of origin of the edge has a height below that of the target point of the edge) (edges 64, 65$_1$);

Descending: the edge intersects the section plane in descending (taking account of the scanning direction considered, the point of origin of the edge has a height greater than that of the target point of the edge) (edges 65$_2$, 66).

To perform this scan, a starting edge of the roof is selected and it is scanned from its point of origin to its target point. To make sure that all the edges of the structure are scanned, the next edge is chosen as being the edge whose origin is the target point of the first edge scanned, and forms the smallest angle with this first edge. Then, the method proceeds in this way from edge to edge until all the edges have been marked.

In the step referenced 242, all these marked edges are scanned again, and are:

kept if they are marked beneath (61, 62);

eliminated if they are marked above (63).

Should the edges be rising edges (64), only the part of the edge situated beneath the section plane is kept (portion shown in solid lines for the edge 64). A new edge is therefore created with its origin being the original peak of the edge 64 and its target peak being the point of intersection of the rising ridge with the truncation plane 60.

As soon as a descending edge (65$_2$) is found, another new edge is also created having:

as its origin, the target peak of the new rising edge created, i.e. the point of intersection A of the section plane 60 with the last rising edge considered 64;

as its target, the peak B corresponding to the intersection of the section plane 60 with the current descending edge 65$_2$.

The part of the descending edge situated beneath the section plane (solid line portion of the descending edge 65$_2$) is also kept in the form of a new edge.

The step referenced 243 is used to determine the upper faces of the roof coming from the truncation. It relies on a list of upper edges of the roof, created during the step referenced 242. Indeed, during this preceding step, when a new edge is created (its point of origin being the intersection of a rising edge with the section plane, and its target the intersection of a descending edge with the section plane, for example the edge [AB]), this new edge is also added to a list of the higher edges of the roof. A simple scan of this list enables the rebuilding 243 of the upper faces of the roof.

After the truncation 24 has been done, a test is performed 250 to ascertain that there still exists at least one roof to be superimposed on the roof that has just been rebuilt. This test amounts to determining if there still exists at least one roof model in the ordered list obtained at the step 20.

If the result is negative, the rebuilding comes to an end 26. It will be noted that, in this case, the roof structure obtained is hollow, which can be remedied not by bringing the rebuilding to an end but by superimposing a flat roof on the last roof rebuilt.

If there still exists at least one roof to be superimposed in the ordered list, the operation loops back 251 to the phase 21 of computation of the 2D structure of the following roof in the list. The set of steps referenced 210 to 250 is therefore reiterated in replacing the footprint by the upper faces of the previous roof, obtained during the step referenced 243, and in considering the procedural parameters associated with this new roof model to be superimposed.

Here below, referring to FIG. 3, we recall the principle of the computation of the straight skeleton of an unspecified polygon as proposed by P. Felkel and S. Obdrzalek in "Straight skeleton implementation" Spring Conference on Computer Graphics, 1998.

Figure 3:
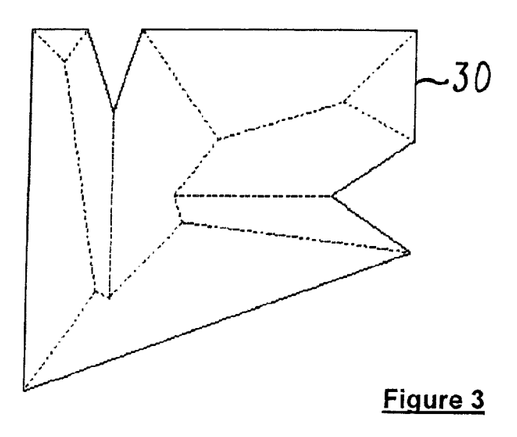
FIG. 3 illustrates the result of the computation of a straight skeleton for any unspecified polygon.

We consider the polygon 30, represented in solid lines in FIG. 3, corresponding for example to the footprint of a building for which it is sought to rebuild a 3D representation.

The computation of the straight skeleton of the polygon 30 is done by successive erosion of this polygon. More specifically, it is the path of the peaks of the polygon 30 during the erosion that constitutes its straight skeleton. These paths are shown in dotted lines in FIG. 3.

In practice, the path of the peaks of the polygon 30 during the erosion can be obtained by construction of the bisector lines of the angles of the polygon.

This straight skeleton corresponds to a realistic roof structure (i.e. a set of roof tops) and can be used for the automatic rebuilding of a roof with several faces from the footprint 30 of a building.

Figure 7:
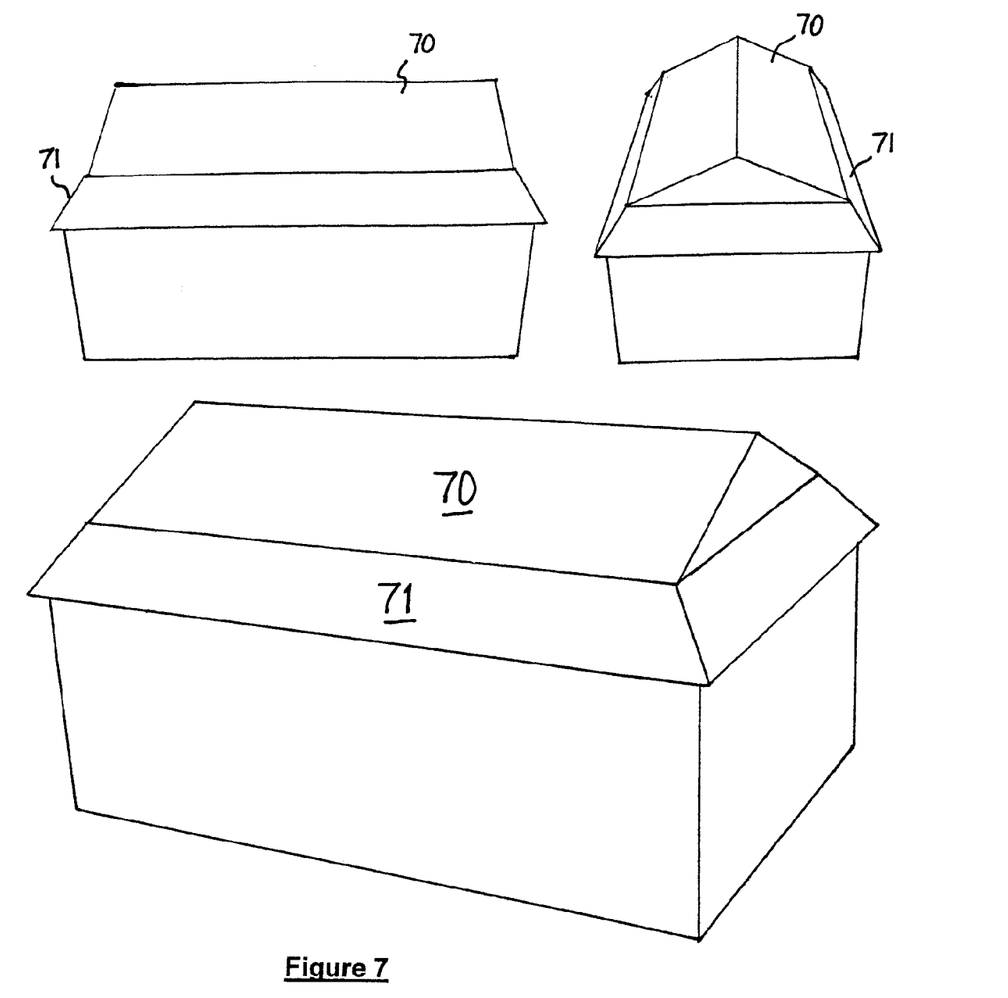
FIG. 7 illustrates the visual result obtained by superimposition of a roof with several sloping sides and a gable roof for buildings having a rectangular footprint.

FIG. 7 shows three views of a 3D representation of a building and of the associated rebuilt roof structure according to an embodiment of the invention, using the following data stream whose syntax complies with that presented here above in the document:

2 1 2.0 50.0 0.7 2 6.0 25.0 0.0

Here below, each of the parameters of this data stream is identified, structured in the form of an ordered list:

| | |
|---|---|
| 2: | the roof structure to be rebuilt comprises two superimposed roofs (70, 71) |
| 1: | the first roof (71) is of a type with several sloping faces having identical slopes |
| 2.0: | the first roof (71) has a maximum height of 2 meters |
| 50.0: | the sloping faces of the first roof (71) are all inclined at 50° |
| 0.7: | the first roof (71) has an eave projection of 0.7 m |
| 2: | the second roof (70) is a gable type roof |
| 6.0: | the second roof (70) has a maximum height of 6 meters |
| 25.0: | the sloping faces of the second roof (70) are inclined at 25° |
| 0.0: | the second roof (70) has no eave. |

Figure 8:
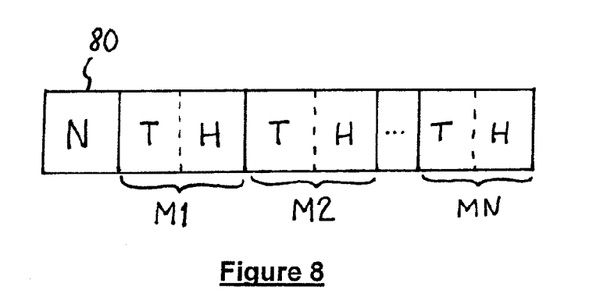
FIG. 8 represents the structure of a roof transmission signal according to an embodiment of the invention.

FIG. 8 illustrates the structure of the signal for the transmission of a roof structure of an embodiment of the invention. Such a signal comprises for example in its header 80 the number N of roof models contained in the ordered list conveyed by the payload of the signal.

This ordered list consists of a succession of roof models M1, M2 to MN each comprising at least:
a field T indicating the type of roof;
a field H indicting its maximum height.

Naturally, as described here above, each of the models M1 to MN may comprise other fields containing other procedural parameters associated with the type of roof considered (slope angles, projection of the eave, etc.). Similarly, if one of the models M1 to MN corresponds to a T type flat roof, this model does not include the field H.

FIG. 8 therefore illustrates a simple and general case of a structure of the signal of an embodiment of the invention.

Here below, referring to FIG. 9, we present the hardware structure of a terminal for building a 3D representation of a roof structure implementing the method described here above.

A building terminal of this kind comprises a memory M 91, a processor unit 90 P, equipped for example with a microprocessor µP, and driven by the computer program Pg 92. At initialization, the code instructions of the computer program 92 are for example loaded into a RAM before being executed by the processor of the central processing unit 90. The central processing unit 90 receives a roof structure 93 to be rebuilt at input, in the form of an ordered list of procedural roof models, conveyed for example by a signal of the same type as that of FIG. 8. The microprocessor µP of the central processing unit 90 implements the steps of the iterated method described here above with reference to FIG. 2, according to the instructions of the program Pg 92. The central processing unit 90 outputs a 3D graphic representation 94 of the roof structure 93. Such a rebuilding terminal can also carry out the rebuilding of the body of the building associated with this roof structure according to a known prior art technique based for example on the footprint of the building.

Figure 9:
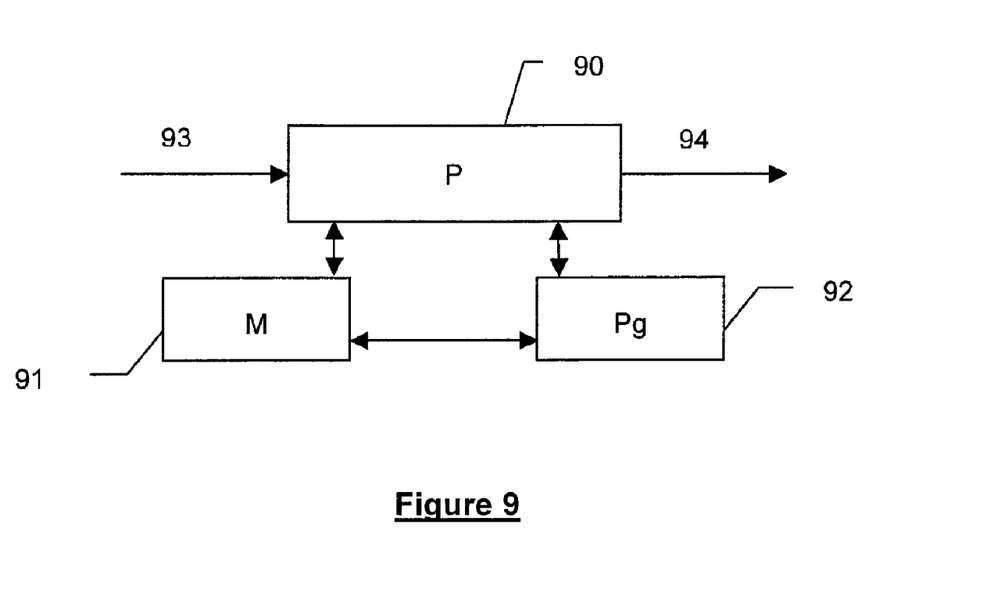
FIG. 9 is a block diagram of a building terminal for building a 3D representation of a roof according to an embodiment of the invention.
Figure 10:
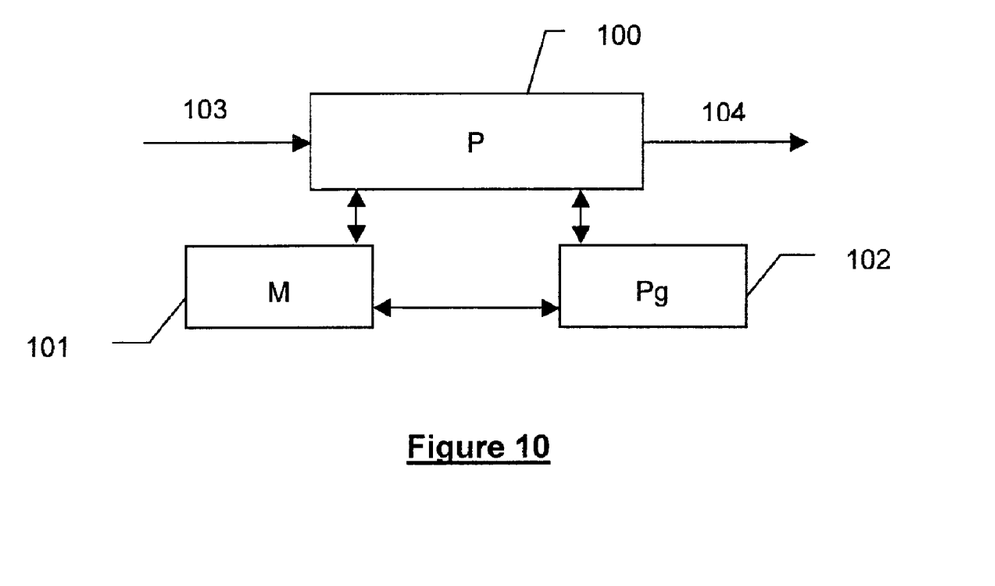
FIG. 10 illustrates the architecture of a server for transmission of a roof structure according to an embodiment of the invention.

FIG. 10 illustrates the hardware structure of a transmission server of a roof structure designed for example for the rebuilding terminal of FIG. 9 and conveyed in the form of a signal of FIG. 8 through the communications network.

Such a transmission server comprises a memory M 101, a processor unit 100 P, equipped for example with a microprocessor µP, and driven by the computer program Pg 102. At initialization, the code instructions of the computer program 102 are for example loaded into a RAM before being executed by the processor of the central processing unit 100. The central processing unit 100 receives a roof structure 103 at input to be transmitted, in the form of an ordered list of procedural roof mode. As a variant, the processing unit 100 may also input a set of roofs each associated with a type and a maximum height parameter, and may take charge of the building, on the basis of these roofs and their parameters, of an ordered list of procedural roof models. The microprocessor µP of the central processing unit 100 implements the steps of the transmission method described here above, according to the instructions of the program Pg 102. The central processing unit 100 outputs a data signal 104 representing a roof structure, of the type shown in FIG. 8, which is designed to travel through a communications network up to a building terminal of the type shown in FIG. 9.

An embodiment of the disclosure provides a technique for the transmission of a roof structure for the 3D representation of a building, which generates a data stream to be transmitted that is more compact than in the case of the prior art techniques while at the same time enabling the rebuilding, in reception, of all types of roof including complex roofs.

An embodiment of the disclosure proposes a technique of this kind that is simple to implement and procures a realistic rendering of the rebuilt roofs.

An embodiment of the disclosure provides a technique of this kind that is suited to all types of visualization terminals and especially terminals with modest processing capacities.

Although the present disclosure has been described with reference to one or more examples, workers skilled in the art will recognize that changes may be made in form and detail without departing from the scope of the disclosure and/or the appended claims.

APPENDIX A

Object-oriented syntax used for the description of a datastream model:

```
class Roof {
int         nbRoofs
RoofPart[ ] roofs
}
class RoofPart {
int(3) roofType
        switch (roofType) {
        case 0 : // Flat roof
        case 1 : // Hip roof
            float roofHeight
            float roofSlopeAngle
            float roofEaveProjection
        case 2 : // Gable roof
            float roofHeight
            float roofSlopeAngle
            float roofEaveProjection
        case 3 : // Saltbox roof
            float roofHeight
            float roofSlopeAngle
            float roofEaveProjection
            int       roofEdgeSupportIndex
        case 4 : // Roof with several distinct sloping sides
            float roofHeight
            float roofSlopeAngle[ ]
            float roofEaveProjection
        }
}
```

The semantics used are the following:

nbRoofs corresponds to the number of superimposed roofs for the current building, i.e. the number of roofs of the ordered lists;

Roofs is a table of roofs described by the class RoofPart. The table must have a size nbRoofs;

roofType is the type of roof: 0-Flat; 1-Hip; 2-Gable; 3-Salt Box; 4-Hip with distinct slopes for the different sides of the roof;

roofHeight is the height of the roof. If this value is negative, the roof is not truncated. This case corresponds to that of a roof having a negative slope too, i.e. a roof that extends into the building;

roofSlopeAngle is the slope angle of each roof sloping side. In the case of a hip roof with identical sloping sides, roofSlopeAngle is therefore a floating-point value that indicates the slope of the roof. In the case of a hip roof with distinct sloping sides, roofSlopeAngle is a table indicating the slope of each of the sloping sides of the roof, the dimension of which is equal to the number of sloping sides of the roof. It will be noted that, in this case, one or more of the angles of this table may be equal to 90°, so as to define a gable roof having sloping sides with distinct slopes;

roofEaveProjection corresponds to the projection of the eave;

roofEdgeSupportIndex is used for salt-box roofs. It corresponds to the index of the edge of the polygon describing the footprint that supports the roof (where the roof is the lowest).

The invention claimed is:

1. A method for transmission of a roof structure for reconstruction of a 3D representation of a building through a communications network, wherein the method comprises:
   generating an ordered list of at least two roof models of the building, each comprising at least:
      a type of roof; and
      a maximum height parameter of said roof, wherein said maximum height parameter of said roof of said list determines a base of the following roof in said list, so that said roof structure corresponds to an ordered superimposition of said roofs of said list; and
   transmitting the ordered list.

2. The method for transmission of a roof structure according to claim 1, wherein said type of roof is chosen from a group comprising:
   a gable type roof;
   a hip type roof;
   a saltbox type roof.

3. The method for transmission of a roof structure according to claim 1, wherein said roof models of said ordered list also comprise at least one of the parameters belonging to the group comprising:
   a slope angle parameter of at least one sloping side of said roof;
   a projection parameter of at least one eave of said roof.

4. The method for transmission of a roof structure according to claim 2 wherein, when said roof is of a saltbox type, said roof model also comprises a supporting edge parameter defined by an index of a lowest edge of said building belonging to said roof.

5. The method for transmission of a roof structure according to claim 1, wherein said ordered list also comprises at least one flat type roof model that includes no parameter.

6. A method comprising:
   producing a data signal representing a roof structure for the reconstruction of a 3D representation of a building, wherein the signal comprises a structure of an ordered list of at least two roof models of the building, each comprising at least:
      a field containing a type of roof;
      a field containing a maximum height of said roof, wherein said field containing a maximum height of a roof of said list determines a base of the following roof in said list so that said roof structure corresponds to an ordered superimposition of said roofs of said list; and
   transmitting the signal through a communications network.

7. A computer program product, comprising program code instructions stored on a computer-readable hardware memory and executable by a microprocessor, wherein the program code instructions implement a method of transmitting a roof structure for reconstruction of a 3D representation of a building through a communications network, wherein the method comprises:
   transmitting an ordered list of at least two roof models of the building, each comprising at least:
      a type of roof;
      a maximum height parameter of said roof, wherein said maximum height parameter of a roof of said list determines a base of the following roof in said list, so that said roof structure corresponds to an ordered superimposition of said roofs of said list.

8. A transmission server of a roof structure for reconstruction of a 3D representation of a building through a communications network, wherein the server comprises means for generating and transmitting an ordered list of at least two roof models of the building, each comprising at least:
- a type of roof; and
- a parameter of maximum height of said roof, wherein said maximum height parameter of a roof of said list determines a base of the following roof in said list, so that said roof structure corresponds to an ordered superimposition of said roofs of said list.

* * * * *